United States Patent [19]
Groth

[11] 3,721,212
[45] March 20, 1973

[54] AQUARIUM COVER

[76] Inventor: Daniel F. Groth, 14 Brookdale Drive, Wilbraham, Mass. 01095

[22] Filed: July 28, 1971

[21] Appl. No.: 166,760

[52] U.S. Cl. ................................................... 119/5
[51] Int. Cl. .............................................. A01k 64/00
[58] Field of Search ........................ 119/5; 240/2 LC

[56] References Cited

UNITED STATES PATENTS

| | | | |
|---|---|---|---|
| 3,515,097 | 6/1970 | Sherman | 119/5 |
| 2,776,642 | 1/1957 | Sepersky | 119/5 |
| 3,066,645 | 12/1962 | Mulder | 119/5 |

Primary Examiner—Hugh R. Chamblee
Attorney—Kenwood Ross et al.

[57] ABSTRACT

The combination with an open topped aquarium of a cover formed with stepped flanges for resting on the ends of the aquarium walls and having an integral upstanding housing for a light source, an opening in the cover below the light source and a clear, transparent plate for closing off the opening, the plate permitting the passage of light to the interior of the aquarium but serving as a barrier to contaminants dropping into the aquarium, the cover having feeding openings therein and feeding units for optional use in the feeding openings and extending into the aquarium.

5 Claims, 4 Drawing Figures

PATENTED MAR 20 1973 3,721,212
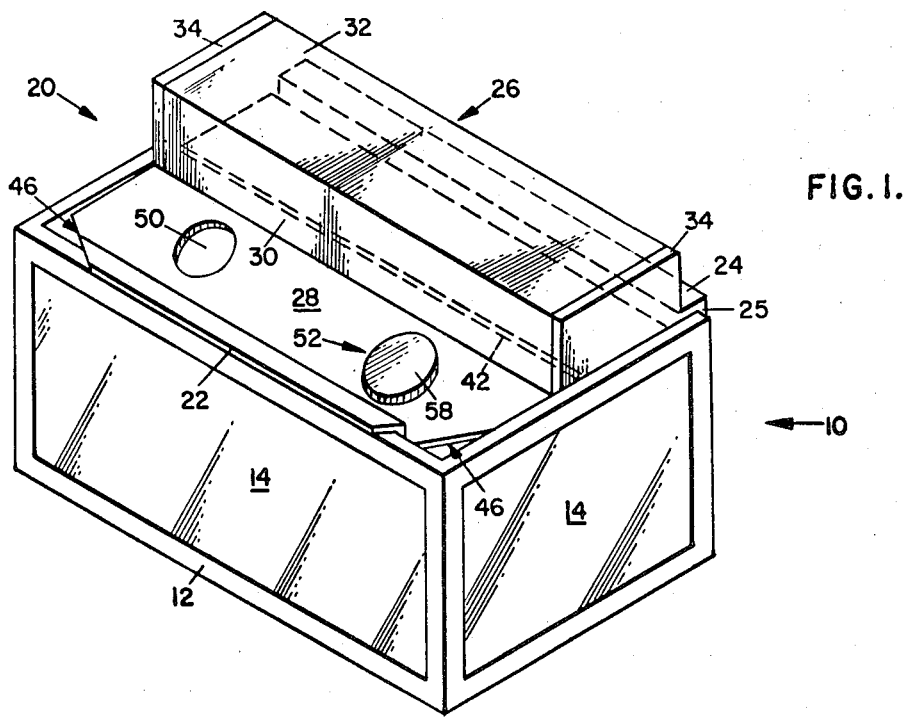
FIG. 1.
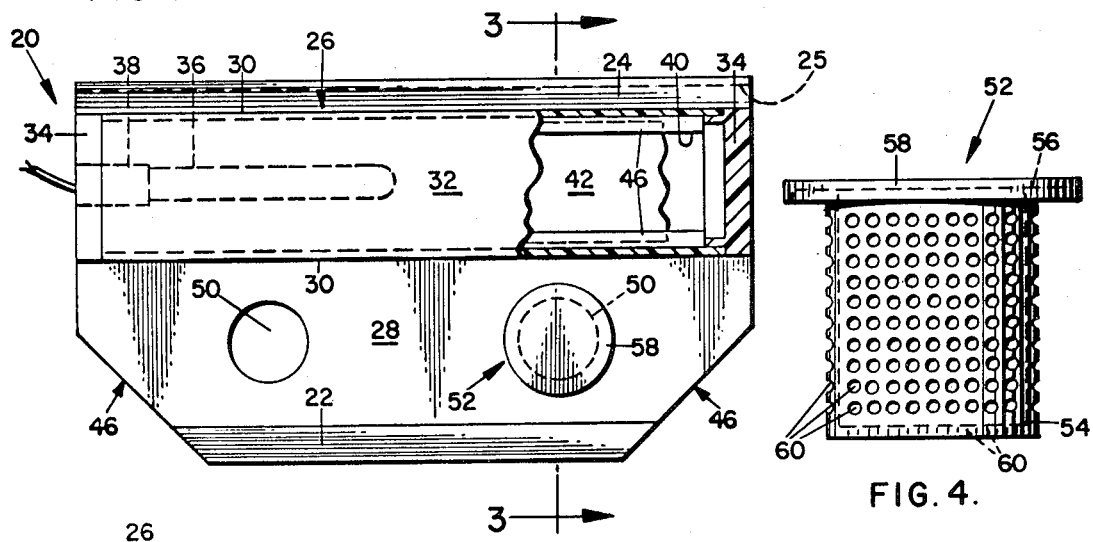
FIG. 2.
FIG. 4.
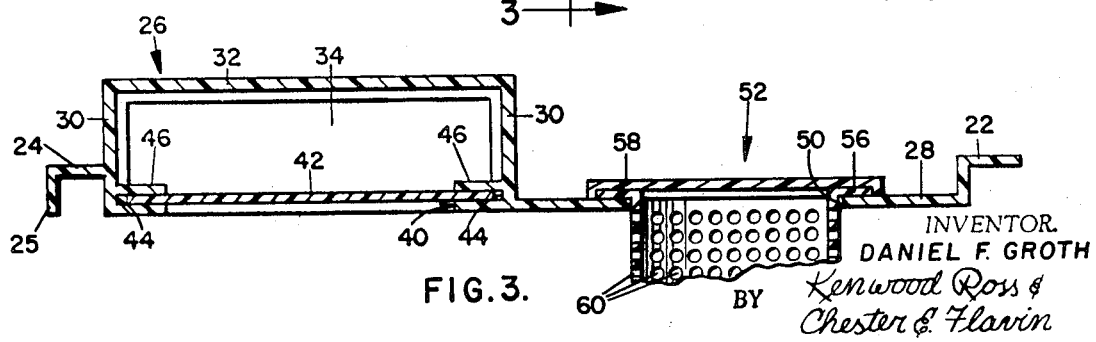
FIG. 3.
INVENTOR.
DANIEL F. GROTH
BY Kenwood Ross &
Chester E. Flavin
ATTORNEYS.

AQUARIUM COVER

The invention relates in general to aquariums and, in particular, to covers or hoods therefor.

It is an object of the present invention to provide a cover or hood for an aquarium, which cover also constitutes a mount for a light source and which is provided with means for permitting the passage of light into the interior of the aquarium while precluding the contamination of the water by dirt or the like, and is also provided with means for permitting controlled feeding of the fish.

It is a further object of the invention to provide an aquarium cover which can be readily manufactured from inexpensive materials, which is economical in operation, and which can be sold at a relatively low price.

It is still another object of the invention to provide a cover for the open top of an aquarium so as to prevent undue evaporation of the water therein and also to prevent the fish from jumping out of the aquarium, the cover being so designed as to provide easy access for feeding the fish.

By way of background information, it should be pointed out that, basically, there are two types of aquarium environments characterized as follows:

| 1. Salt Water | 2. Fresh Water |
|---|---|
| Marine Fish | Tropical Fish |
| Sensitive, delicate water balance | Flexible water balance |
| Delicate Fish in captivity | Hardier Fish |

In short, the hobbyist has a much more difficult time maintaining a salt water aquarium because of the delicate chemical balance of the water. The slightest amount of foreign matter may upset this balance resulting in sickness or death to the aquarium inhabitants.

The uniqueness of the present invention resides in the sealed or enclosed light source. This factor is uniquely beneficial to salt water fish and also desirable for fresh water fish.

The open light source which is exposed in the prior art allows condensation, evaporation, deterioration and rust to metal, wire and electrical fixtures. This foreign matter when accumulated is capable of dropping into the aquarium because of the open, exposed source and, in the case of salt water fish, it would be totally fatal to the inhabitants of the salt water aquaria. The slightest chemical change in their environment is dangerous.

Because of the enclosed light source in the cover of the invention, rust and deterioration from condensation is materially reduced and, therefore, the functional life of the cover has a far greater potential than do the prior art covers. This longer use potential represents a saving in time and money to the hobbyist.

The need for cleaning the cover of the invention is also greatly minimized. Although there could ultimately be some deterioration to the fixture and light source in the cover, any accumulation of foreign matter regardless of amount will not drop or enter the aquarium below because of the protective shield, the shield being between the light source or fixture and the aquarium water below.

The current trend toward salt water aquaria has taken place within the last few years and, since the majority of the prior inventions are approximately 10 years old, it is not believed that these inventions were developed with salt water aquaria in mind; but rather were developed for the fresh water aquarium. The majority of prior inventions are inept for salt water use.

The use of the cover hereof also reduces evaporation of the water level in the aquarium since the condensation created from the heat of the light source rests on the under side of the cover and slide plate and then drops back into the aquarium.

In prior inventions when a hobbyist feeds his fish the cover or hood must be removed. With the instant invention the cover need not be removed as the fish may be fed through the feeding openings, or by means of the feeding units. Since some of these prior art covers or hoods are cumbersome this is a distinct inconvenience.

The cover hereof is partially recessed into the aquarium offering a neater appearance and insuring against cover displacement.

Interchangeable sliding and colored plates at the light source offer a more asthetic appearance and add a decorative touch to the fish as well as plant life within the aquarium.

Certain of the prior art patents have been traditionally made from metal which ultimately rusts and forms foreign matter. The cover of the invention is superior because the complete lower surface is all plastic, wherefore no rust or the like can form to pollute the water below.

Since the light source is completely enclosed, and the cover is formed from plastic, it is buoyant. Thus, if the cover is accidently dropped into the tank, it can be easily and quickly retrieved, wherefore the light source and its electrical connections will not come into contact with the water, an important feature in avoiding dangerous electrical shocks.

When an embossed plate is used, the light is diffused and expanded, thus giving more balanced lighting and increasing the amount of light passed to the interior of the tank, providing better illumination and helping aquarium plants to grow.

With a vari-colored plate, different color effects are obtained without the use of more expensive colored light bulbs.

In the drawing:

FIG. 1 is a perspective view of an aquarium and cover embodying the invention;

FIG. 2 is a top plan view of the aquarium cover of FIG. 1;

FIG. 3 is a cross-sectional view taken on line 3—3 of FIG. 2; and

FIG. 4 is an elevational view of one of the feeding units used with the cover of the invention.

An aquarium, generally indicated by 10, of conventional construction includes a frame 12 and transparent inserts 14 preferably formed of glass, which form the side, bottom and end walls thereof.

The aquarium has an open top which is closed by the cover of the invention, generally indicated by 20.

The cover is preferably formed from a suitable opaque plastic material and is provided along its longitudinal edges with stepped flanges 22 and 24 adapted to rest on the upper ends of the side walls of the aquarium, with at least one of the flanges 22 or 24 being provided with a depending rim or bead 25 to prevent shifting of the cover.

The cover includes a housing 26 which rises upwardly from and is formed integrally with a horizontally-extending base wall 28 disposed below the plane of the flanges 22 and 24. The housing includes spaced side walls 30, 30 interconnected by a top wall 32.

End caps 34 close off the ends of the housing, being releasably fixed thereto in the manner of a snap fit.

One of the end caps supports a light source comprising a conventional lamp 36 and socket 38, shown only in FIG. 2, for providing illumination and warmth to the interior of the aquarium through a longitudinally-extending slot or opening 40 provided in bottom wall 28 of the cover below the lamp and enclosed by the housing.

The light source is preferably mounted for lateral sliding movement within the housing between the walls 30 in order that the position of the light source may be periodically changed so that light is projected to all areas of the aquarium thereby providing equal light to all plants within the aquarium.

A plate 42 is slidably receivable in a longitudinally-extending channel 44 provided adjacent the lower end of each side wall 30 and defined by base wall 28 and a channel wall 46 disposed in spaced parallelism thereto thereabove, wherefore the plate spans opening 40 in the base wall.

The plate, which is inserted into the channels upon removal of the end caps, is preferably formed from clear plastic. It may be plane or embossed to spread the light, and it may be uncolored or vari-colored to produce different pleasing light effects within the aquarium.

The plate, being clear, permits the passage of light therethrough. It precludes contamination of the water and resultant death of the fish by acting as a barrier in preventing rust and dirt and other debris from falling through the opening.

By use of the plate, evaporation is reduced, as is the possibility of rust at the lamp socket 38, and the opening is effectively closed off to prevent the fish from leaping out of the aquarium.

If desired, the cover may be sold with a set of plates, for example, a plane, uncolored plate, an embossed, uncolored plate, a colored plate or any combination thereof, to provide a pleasing variety of aquarium lighting effects.

A pair of the corners of the cover is cut away or beveled as at 48 to permit air to enter the aquarium, and also to permit the suspension of heaters, filters, thermometers and the like into the aquarium.

A pair of spaced feeding openings 50 is provided in base wall 28 of the cover.

A feeding unit, generally indicated by 52, may optionally be disposed in one or both of the feeding openings.

The feeding unit is preferably of the type comprising an open-topped container 54 of suitable dimensions to pass freely through the feeding openings and having an upper rim or flange 56 adapted to rest on base wall 28 of the cover whereby the container is suspended from the cover into the interior of the aquarium.

A closure 58 is releasably attached to upper rim or flange 56 whereby the container may be closed, and a plurality of openings 60 is provided in the side and bottom walls of the container whereby the fish can gain access to the food within the container.

The feeding unit permits controlled feeding of foods such as tubifex, micro and white worms, and frozen brine, shrimp or dry food.

The unit greatly reduces pollution and, when two units are employed, allows feeding of segregated fish within the aquarium, which segregation may be effected by means of partition, breeding trap or the like.

When two units are used the use of different types of food for particular purposes in each unit is possible. For instance, one unit may contain one type of food suitable for fry and the other a different type of food suitable for adult fish.

Several days supply of tubifex worms can be left in the feeding unit without fear of pollution or spoilage. In addition, fish will not overeat live food as they will do with other foods.

The feeding openings and/or feeding units permit feeding without removal of the cover.

The cover is attractive, inexpensive, easy to clean and extremely effective in its use.

I claim:

1. A cover formed from opaque plastic material for releasable engagement with an open topped aquarium comprising: an integral base and housing,
   the housing extending upwardly from the base,
   the base being provided with stepped flanges for resting on the upper ends of the aquarium walls,
   and being beveled at at least one of its corners for providing air openings and for permitting the suspension of accessories in the nature of heaters, filters and thermometers into the aquarium,
   a light source within the housing,
   an opening in the base below the light source,
   a clear, transparent plate slidably related to the base for closing off the opening to enclose the light source while diffusing and spreading the light into the interior of the aquarium,
   feeding openings in the base,
   and a feeding unit in at least one of the feeding openings and extending into the aquarium for segregated feeding.

2. A cover according to claim 1, wherein the plate is vari-colored.

3. A cover according to claim 1, wherein the plate is embossed.

4. A cover according to claim 1, wherein the light source is movable within the housing.

5. A cover according to claim 1, wherein the feeding unit comprises a container suspended from the base and having a plurality of feeding openings in its side and bottom walls.

* * * * *